United States Patent Office 3,842,157
Patented Oct. 15, 1974

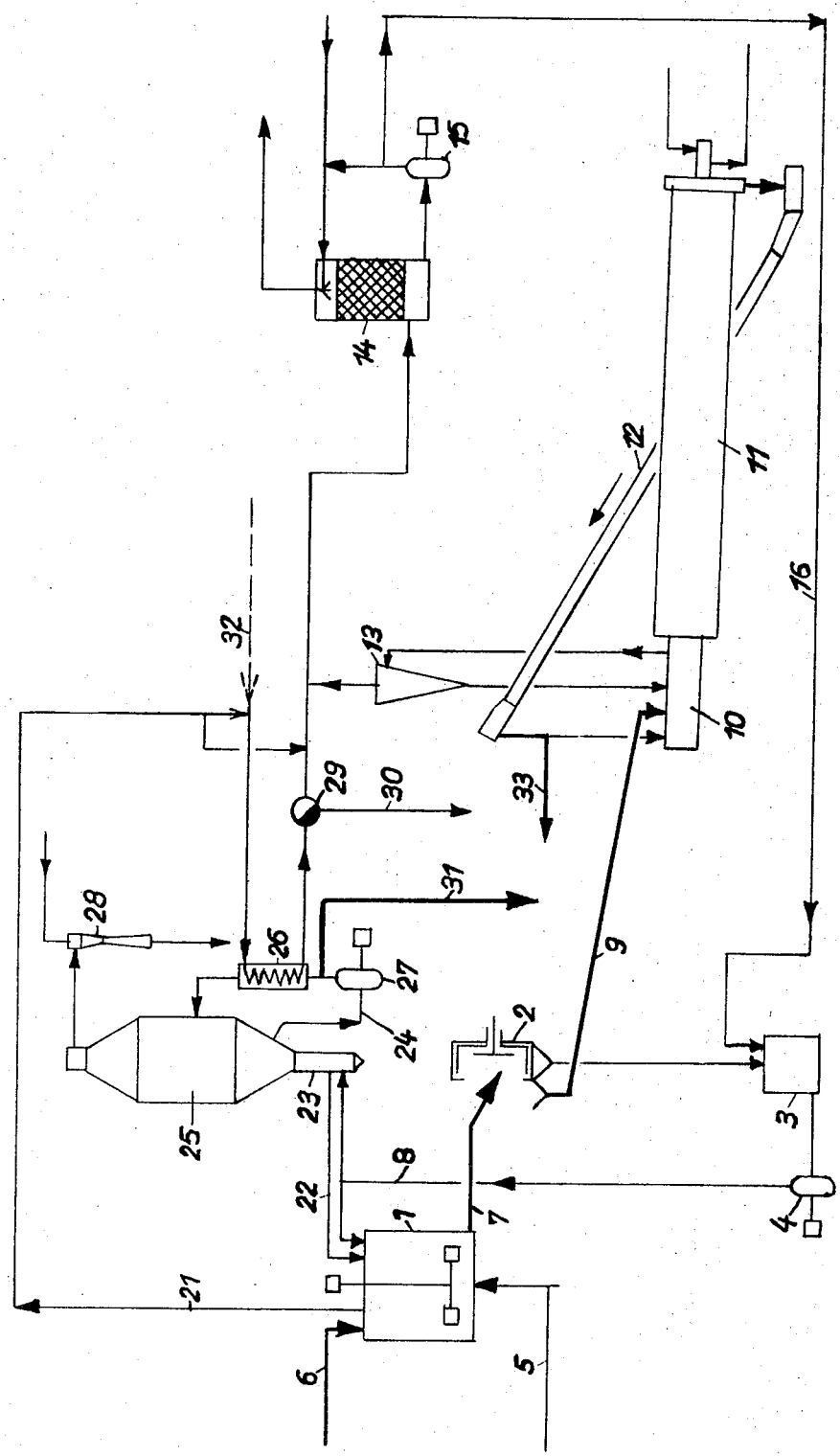

3,842,157
PROCESS FOR THE PREPARATION OF SODIUM CARBONATE MONOHYDRATE FROM A SODIUM HYDROXIDE SOLUTION PRODUCED ACCORDING TO THE DIAPHRAGM PROCESS
Ulrich Neumann, Kiefernweg, West Germany, assignor to Chemiebau Dr. A. Zieren GmbH u. Co. KG, Cologne, Germany
Filed Feb. 14, 1972, Ser. No. 226,024
Claims priority, application West Germany, Feb. 12, 1971, P 21 06 786.7
Int. Cl. C01d 7/00
U.S. Cl. 423—188
13 Claims

ABSTRACT OF THE DISCLOSURE

A process for the single stage production of sodium carbonate monohydrate which comprises carbonating an aqueous sodium hydroxide solution containing about 45 to 55% by weight NaOH and from 0.2 to 5% by weight, preferably from 0.5 to 2% by weight of an inorganic salt such as chloride, with a $CO_2$-containing gas at a temperature of from 70 to 110° C. to form sodium carbonate monohydrate at a stationary concentration of sodium chloride in the liquid phase of from 1 to 5% by weight with simultaneous evaporation of water, preferably of about 50 to 85% of the total water to be evaporated. Particulate sodium carbonate monohydrate is separated from the mother liquor and the clarified mother liquor is divided into two portions, the relative volumes of which are a function of the chloride or other salt content of the sodium hydroxide starting solution. Generally, the ratio of the portion of the mother liquor in percent by volume to be passed to the evaporator stage to the chloride or other salt concentration in percent by weight will range from 5 to 50, preferably from 10 to 30. A first portion generally comprising from about 60 to 95% by volume of the clarified mother liquor is recycled to the carbonation stage. A second portion generally comprising correspondingly from about 40 to 5% by volume of the clarified mother liquor is evaporated, preferably under reduced pressure, at a temperature of from about 50 to 110° C. to precipitate sodium carbonate monohydrate therefrom and remove about 15 to 50% by volume of the mother liquor water content therefrom. Sodium carbonate monohydrate precipitated in the evaporator is separated therefrom, leaving NaCl behind in the solution phase of the evaporation mixture. The sodium carbonate monohydrate separated in the evaporation stage preferably will be recycled to the carbonation stage, whilst the sodium carbonate monohydrate separated in the carbonation stage can be calcined directly to high bulk density soda ash. Sodium carbonate monohydrate and dense soda ash produced from impure sodium hydroxide solutions in accordance with the process of the invention are of a commercially acceptable quality, containing less than 1% by weight, generally less than 0.3% by weight Cl.

BACKGROUND OF THE INVENTION

Field of the Invention

This invention relates to a process for the preparation of sodium carbonate monohydrate. More particularly, this invention relates to a process for producing sodium carbonate monohydrate from a sodium hydroxide solution obtained in the production of chlorine via the diaphragm cell process.

Description of the Prior Art

In order to meet the greatly increasing demand for chlorine, the electrolysis of sodium chloride according to the diaphragm process is being increasingly utilized. In addition to chlorine, a sodium hydroxide solution having a high NaCl content is obtained as a product in the process. Heretofore, this sodium hydroxide solution from the diaphragm has been evaporated to at most about 50% by weight NaOH, during which a large portion of the NaCl precipitates and can be separated from the sodium hydroxide solution. The thus-obtained sodium hydroxide solution still contains about 1% by weight of NaCl and can be further purified by extraction procedures. The market for sodium hydroxide solutions, however, is far less than that for chlorine.

Several suggestions have been advanced for converting the sodium hydroxide solution obtained in the diaphragm process into sodium carbonate which can be sold more readily than the sodium hydroxide solution and is widely utilized in the glass industry as dense-grade soda ash. Thus, it is known from German Pat. 1,188,059 to carbonate the diaphragm caustic liquor together with ammoniacal brines in the production of ammonia. Although NaCl in the caustic liquor is thereby completely converted into soda, this procedure exhibits the severe practical disadvantage that a close connection must be maintained between the alkali chloride electrolysis plant and the soda plant, which plants are seldom formed at the same location. Furthermore, the sodium hydroxide solution fed to the soda plant must there be processed into soda via the expensive two-step process of carbonation to bicarbonate followed by calcination. Additionally, this method of directly treating NaOH from the caustic diaphragm liquor produces a soda of a low density, whereas the high density material is commercially preferred.

It is known from German Pat. 1,141,627 to carbonate sodium hydroxide solution in a first stage without either evaporation of water or separation of the monohydrate, and to precipitate sodium carbonate monohydrate from the carbonated solution in a second stage with the vaporization of water. While processing the caustic liquid containing NaCl, the mother liquor which is recycled must be constantly purified to minimize adherence of NaCl to the separated monohydrate. The purification step inherently leads to either considerable losses of sodium carbonate and sodium hydroxide if a commercially acceptable quality of soda is to be produced, or an excessively high NaCl content in the soda. A further disadvantage of this process resides in the requirement that the water to be vaporized must be withdrawn under reduced pressure.

In U.S. Pat. 2,842,489, a three-stage carbonation process is described for the production of sodium carbonate monohydrate from caustic diaphragm liquor wherein the filtrate from the monohydrate precipitation step is carbonated to sesquicarbonate, and the thus-formed mother liquor is further carbonated to bicarbonate. Solid sesqui- and bicarbonate can be used for the additional carbonation of diaphragm liquor. Due to its technical complexity, this process has not achieved commercial acceptance.

Carbonation by spraying in a $CO_2$-containing gas, for example as taught in U.S. Pat. 3,202,477, is unsuitable for treatment of diaphragm liquor to produce commercial quality soda, because the NaCl content of the liquor remains in the soda. Additionally, the spraying method yields only a low bulk density soda of limited marketability which must be further processed to obtain the high density form, since only the monohydrate can be calcined to high bulk density soda ash.

It is also known to carbonate diaphragm liquor as taught in German Published Application 1,567,921 and German Published unexamined Application 1,881,168. In this Bayer-Chemibau process, the caustic liquor is first concentrated by evaporation, and the main quantity of the NaCl is crystallized out and separated. The sodium salts which remain in the solution, e.g., typically about 3.2% by weight of NaCl and 0.2% by weight of $Na_2SO_4$, build up in the mother liquor during the carbonation because the mother liquor is recycled; as a result of this buildup, a chloride- and sulfate-containing soda is produced which is not of commercially acceptable quality. This technique is fully described in the copending U.S. patent application of Herbert Furkert, Ser. No. 164,013, filed July 19, 1971, the contents of which are incorporated by reference herein.

While the process described in the copending application is suitable for many applications, it has been found according to the present invention that when using sodium hydroxide starting materials contaminated with salts such as chlorides, sulfates, chlorates and bromides such as in the sodium hydroxide which is obtained in the diaphragm cell process for producing chlorine, recycling all of the mother liquor into the carbonation stage causes these salts such as chlorides to build up in the system, thereby contaminating the final product and rendering it unacceptable for commercial use without further costly purification. Mere purging of the mother liquor in this context is economically wasteful, since additional apparatus is needed to monitor the chloride content in the mother liquor and final product, and to regulate the timing and extent of the purging. Furthermore, the purged liquor is saturated with sodium carbonate monohydrate, and disposal thereof considerably reduces the yield of the process. Additionally, the chloride content of the purged liquor is too low to economically recycle it directly into brine treatment. Discarding purged mother liquor results in an economic loss of $4,000 per kiloton as compared to the present process, as well as requiring that monitoring and control equipment be added to the basic apparatus.

SUMMARY OF THE INVENTION

Accordingly, it is a general object of this invention to provide a process for producing commercially pure sodium carbonate monohydrate.

Another object of this invention is to provide a process for producing sodium carbonate monohydrate of commercially acceptable purity from a sodium hydroxide solution contaminated with chloride.

A further object of this invention is to provide a continuous process for producing sodium carbonate monohydrate which can be calcined into a dense soda ash in which the chloride and sulfate contents are reduced to commercially acceptable amounts.

An additional object of this invention is to provide a process for producing sodium carbonate monohydrate from a sodium hydroxide solution which has been obtained as a product in a diaphragm cell process for the electrolytic production of chlorine.

Yet another object of this invention is to provide a diaphragm cell process for the electrolytic production of chlorine wherein the sodium hydroxide solution obtained as a product is economically converted directly to commercial grade sodium carbonate monohydrate, which can be optionally calcined to produce commercial grade high bulk density soda ash.

Briefly, these and other objects of this invention are achieved in one aspect thereof by providing a process for the single stage production of sodium carbonate monohydrate which comprises carbonating an aqueous sodium hydroxide solution containing about 45 to 55% by weight NaOH and from 0.2 to 5% by weight, preferably from 0.5 to 2% by weight of an inorganic salt such as chloride with a $CO_2$-containing gas at a temperature of from 70 to 110° C. to form sodium carbonate monohydrate at a steady state concentration of sodium chloride in the liquid phase of from 1 to 5% by weight with simultaneous evaporation of water, preferably of about 50 to 85% of the total water to be evaporated. Particulate sodium carbonate monohydrate is separated from the mother liquor and the clarified mother liquor is divided into two portions, the relative volumes of which are a function of the chloride or other salt content of the sodium hydroxide starting solution. Generally, the ratio of the portion of the mother liquor in percent by volume to be passed to the evaporator stage to the chloride or other salt concentration in percent by weight will range from 5 to 50, preferably from 10 to 30. At first portion generally comprising from about 60 to 95% by volume of the clarified mother liquor is recycled to the carbonation stage. A second portion generally comprising correspondingly from about 40 to 5% by volume of the clarified mother liquor is evaporated, preferably under reduced pressure, at a temperature of from about 50 to 110° C. to precipitate sodium carbonate monohydrate therefrom and remove about 15 to 50% by volume of the mother liquor water content therefrom. Sodium carbonate monohydrate precipitated in the evaporator is separated therefrom, leaving NaCl behind in the solution phase of the evaporation mixture. The sodium carbonate monohydrate separated in the evaporation stage preferably will be recycled to the carbonation stage, whilst the sodium carbonate monihydrate separated in the carbonation stage can be calcined directly to high bulk density soda ash. Sodium carbonate monohydrate and dense soda ash produced from impure sodium hydroxide solutions in accordance with process of the invention are of a commercially acceptable quality, containing less than 1% weight, generally less than 0.3% by weight Cl.

In one embodiment of this invention, a salt-containing sodium hydroxide solution formed in a diaphragm process for producing chlorine is evaporated to 45–55% by weight of NaOH, the thus-precipitated NaCl is separated, the concentrated sodium hydroxide solution is carbonated with a carbon-dioxide-containing gas to sodium carbonate monohydrate with the simultaneous vaporization of water, the thus-formed sodium carbonate monohydrate is separated from the mother liquor and optionally calcined to dense soda ash, and the mother liquor is recycled into the carbonation stage. Techniques for conducting this process are generally described in the aforementioned copending U.S. Patent Application. In accordance with the present invention, the process is further modified by recycling only a portion of the mother liquor, generally 5 to 40% by volume thereof, preefrably only 10 to 25% by volume, into the carbonation stage, while the remainder of the mother liquor is evaporated at a temperature of about 50 to 110° C. to deposit addition sodium carbonate monohydrate and the thus-deposited monohydrate is separated by conventional means from the final solution. By branching off a part of the mother liquor from the recycle to the carbonation stage, it is possible to control the NaCl content in the carbonation stage and maintain it at a sufficiently low level such that, when using a diaphragm liquor vaporized to 45–55% by weight of NaOH, the moist monohydrate separated from the carbonation stage exhibits a tolerable NaCl content of less than 1% by weight, generally less than 0.3% by weight. The Cl content of dense soda ash obtained by calcination of this monohydrate is below 0.3%, and thus corresponds to commercial specifications. The relative volume of mother liquor branched off to the evaporator stage is a function of the chloride content of the starting NaOH solution as heretofore indicated. In general, the procedure is carried out in the carbonation stage with a content of between 1 and 5% by weight of NaCl in the liquid phase of the reaction mixture. Higher NaCl contents are permissible if a higher Cl content in the thus-produced soda, e.g., up to 1% by weight, or an after-washing of the monohydrate, can be tolerated. However, the latter mode of operation requires a higher heat consumption because the washing water must be additionally vaporized. Although the branched-or portion of the mother liquor is preferably evaporated at a temperature of between 50 and 110° C., the objects of the present invention can also be attained under conditions laying outside of this temperature range, if a high temperature and/or a high vacuum can be tolerated. The final solution remaining in the evaporation stage after separation of the monohydrate contains almost the entire NaCl which enters into the process with the sodium hydroxide solution, and is saturated with $Na_2CO_3$ at the discharge temperature. This final liquor can be employed for the electrolysis in the preparation of the brine.

In accordance with a preferred embodiment of the invention, the sodium carbonate monohydrate deposited in the vaporization stage is separated and recycled into the carbonation stage. The thus-entrained solution of monohydrate deposited in the evaporation stage is relatively rich in NaCl; for this reason, it is generally not advisable to combine this monohydrate directly with the product separated in the carbonation stage. By the return into the carbonation stage, a uniform final product is obtained, the NaCl content of which is essentially a function of the comparatively low NaCl content in the solution of the carbonation mixture and the moisture content of the monohydrate separated from this stage.

In a particularly preferred embodiment, carbonation is conducted at an average temperature of between 70 and 110° C. In this temperature range, under normal pressure, a satisfactory rate of water evaporation is attained; in this connection, the carbonation temperature within this range will increase as the $CO_2$ content of the gas increases, as is known in the art. The carbonation reactor is preferably an agitator-equipped vessel, wherein the carbon dioxide is introduced in finely divided form, for example with the aid of a gas-distributing agitator. Other known carbonation reactors wherein a coherent liquid phase is present can likewise be utilized. The separator for separating the carbonation mixture into sodium carbonate monohydrate and mother liquor is preferably a centrifuge, but it is also possible to use other known devices, such as filters.

In accordance with a preferred embodiment of the invention, the process is conducted in the evaporation stage with an average content of between about 15 and 23% by weight of NaCl in the solution of the evaporation mixture. This extremely high NaCl content is possible because the monohydrate separated in this stage can be fed to the carbonation stage, where it is extensively freed of adhering NaCl. On the other hand, a high NaCl content in the solution is advantageous because in this case the quantity of final solution is small and can consequently be completely utilized in brine preparation for the electrolysis.

In some cases, it is more advantageous to operate the evaporation stage under reduced pressure and to heat this stage with vapors from the carbonation stage. Preferably, in the carbonation stage, 50–85% by weight, and in the evaporation stage, 15–50% by weight of the total water vaporized is evaporated. In this manner, heat liberated in the carbonation stage is utilized for the water evaporation, while only a small portion of the total water evaporated is withdrawn from the evaporation stage which is heated with external heat and is preferably operated under reduced pressure. The subatmospheric pressure in the evaporation stage is generally between 100 and 400 mm. Hg. To produce the required partial vacuum, conventional apparatus such as a liquid seal pump with a mixing condenser connected in front thereof can be used.

One apparatus for conducting the process of this invention comprises a carbonation stage with a recirculating system connected thereto wherein a device for separating the sodium carbonate monohydrate from the mother liquor is arranged; this apparatus is characterized by having an evaporator stage connected to the recirculation system of the carbonation stage, from which particulate material deposited during evaporation can be withdrawn separately from the final solution. The evaporation stage preferably comprises a crystallizing evaporator wherein the separated monohydrate is automatically sedimented and washed during this step with the mother liquor of a low NaCl content coming from the carbonation stage; in this manner, the adhering solution of monohydrate exhibits a considerably lower salt content leaving this stage than the solution phase of the crystallizing evaporator. The crystallizing evaporator has an external cycle to which is fed the heat required for the evaporation, and from which is withdrawn the final liquor leaving the process.

In general, the procedure will be such that the evaporator stage is fed with an amount of heat required above and beyond the exothermic heat of reaction liberated in the carbonation stage, for the purpose of water evaporation. In this case, the carbonation stage requires no supply of heat from the outside.

Brief Description of the Drawing

The invention will be described in greater detail below with reference to the appended drawing wherein the flowsheet of a plant for conducting the process of this invention is schematcially illustrated.

Detailed Discussion

Referring now to the drawing, sodium hydroxide solution, concentrated by the evaporation of a diaphragm liquor in a conventional evaporator (not shown) to about 50% by weight of NaOH (NaCl content about 1% by weight), is fed to an agitator-equipped reactor 1 via conduit 6. The $CO_2$-containing gas is introduced into the reactor through conduit 5; the carbonation reaction, crystallization of the monohydrate, and water evaporation all take place in this reactor. The thus-formed suspension is continuously discharged from the reactor via line 7 and separated, in centrifuge 2, into moist monohydrate and mother liquor. A portion of the mother liquor is collected in a receiver 3 and recycled by means of pump 4 via line 8 into the carbonation reactor 1. A portion of the returning mother liquor stream 8 is fed to a crystallizing evaporator 25, which is maintained under reduced pressure by vacuum unit 28. In the crystallizing evaporator, sodium carbonate monohydrate crystallizes during the evaporation of water; these crystals are deposited as a sediment in the lower evaporator section 23, where they are simultaneously washed by the mother liquor entering from conduit 8 prior to being fed to the carbonation reactor via conduit 22.

The evaporator 25 has an external circulating line 24 provided with a pump 27 and a heat exchanger 26, through which is circulated the essentially solids-free mother liquor solution. At 31, the NaCl-containing final solution is discharged from this circulating line. A heat exchanger 26, in the illuustrated embodiment, is in communication with the carbonation reactor via conduit 21 and is heated by the vapors produced in the reactor or optionally by means of additional steam 32. The vapor exiting from the heat exchanger 26 is separated, in the steam trap 29, into condensate and exhaust steam, the use of which will be described in greater detail below.

The moist monohydrate from centrifuge 2 is fed via conduit 9 to a drying drum 11 having a mixer 10 connected in front thereof. In mixer 10, the moist monohydrate is first mixed with a portion of the dense soda ash formed in drying drum 11 and then calcined in the drum 11. The thus-formed dense soda ash is returned to the feeding side of the drum by a conveying means 12, partially returned into the mixer 10, and partially withdrawn as a product at 33. The vapors escaping from the drum 11 are extensively freed of entrained soda particles in a cyclone separator 13, combined with the waste steam of the heat exchanger 26, and washed in scrubbing tower 14 to remove residual soda. The waste gas is then discharged into the atmosphere. The soda solution which forms during the course of the washing process is circulated via pump 15 and can be fed, via conduit 16, continuously to the pump receiver 3 and thus to the carbonation process stage of this invention.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE

A diaphragm sodium hydroxide solution containing about 15% by weight NaCl and about 11% by weight NaOH is concentrated by evaporation to about 50% by weight of NaOH; during this step a major portion of the NaCl is separated by crystallization. 1,510 parts by weight of this sodium hydroxide solution is fed per hour, to the carbonation reactor 1; this solution still contains about 1% by weight of NaCl, as well as lesser amounts of $Na_2SO_4$. The reaction of this sodium hydroxide solution takes place in the carbonation reactor with a high carbon dioxide content gas at about 100° C. with the evaporation of water. The sodium carbonate monohydrate suspension is centrifuged, there being obtained per hour 1,222 parts by weight of moist monohydrate containing 2.0 parts by weight of NaCl dissolved in the adherent moisture, and 0.7 parts by weight of occluded NaCl.

The mother liquor from centrifuge 2 is partially returned into the carbonation reactor 1; the rate of circulation is selected so that a fixed NaCl concentration of 2.5% by weight is maintained in the mother liquor and/or in the solution of the carbonation mixture. 496 parts by weight of mother liquor with 12.4 parts by weight of NaCl, 144 parts by weight of $Na_2CO_3$, and 1.1 parts by weight of secondary components is fed per hour to the crystallizing evaporator 25 and evaporated therein at a temperature of about 70° C. under reduced pressure. 65.5 parts by weight of final solution with 12.4 parts by weight of NaCl, 8.2 parts by weight of $Na_2CO_3$, and 0.9 part by weight of secondary components is withdrawn per hour from the circulating line 24 of the crystallizing evaporator 25. This discharged stream is fed to a brine preparation station. Upon the withdrawal of this amount of final solution, a fixed NaCl concentration of, on the average, 19% by weight is attained in the solution phase of the evaporator stage. Furthermore, in the crystallizing evaporator 25, 271.5 parts by weight of water is evaporated per hour, and 159 parts by weight of sodium carbonate monohydrate is withdrawn therefrom per hour in the solid phase and fed to the carbonation reactor 1. The moist monohydrate withdrawn from the centrifuge 2 is calcined at a temperature of about 175° C. The chloride content of the thus-formed soda is 0.16% by weight; its bulk density is $d=1.02$.

The process of this invention is suitable for processing all sodium hydroxide solutions having for example, a content of 10–20% by weight NaOH and 10–20% by weight NaCl. In addition to high-percent carbon dioxide, it is also possible to employ waste gases of a low impurity content, with a $CO_2$ content of above about 8% by volume in the carbonation stage.

The preceding example can be repeated with similar success by substituting the generically or specifically described reactants and/or operating conditions of this invention for those used in the preceding example.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for producing sodium carbonate monohydrate by carbonating at 70–110° C. in a single stage, a diaphragm process aqueous sodium hydroxide solution concentrated to 45–55% NaOH and contaminated with from 0.2 to 5% by weight of NaCl, with a $CO_2$-containing gas to form said monohydrate and simultaneously evaporate water from said solution, separating particulate monohydrate from its mother liquor, and recycling clarified mother liquor to the carbonation stage, the improvement comprising:
    (a) dividing said clarified mother liquor into a first portion and a second portion;
    (b) recycling the first portion comprising from about 60 to 95% by volume of said clarified mother liquor to said carbonation stage;
    (c) passing the second portion comprising from about 40 to 5% by volume of said clarified mother liquor to an evaporator stage;
    (d) evaporating said second portion to remove about 15 to 50% by volume of the mother liquor water content therefrom, thereby precipitating solid sodium carbonate monohydrate; and
    (e) separating said monohydrate from said inorganic salt in a solution phase of the evaporation mixture.

2. A process according to Claim 1, further comprising recycling the sodium carbonate monohydrate separated in the evaporator to said carbonation stage.

3. A process according to Claim 1, further comprising calcining the sodium carbonate monohydrate separated in the evaporation into high bulk density soda ash.

4. A process according to Claim 1, wherein said NaCl is present in an amount of from 0.5 to 2% by weight.

5. A process according to Claim 4, wherein a NaCl content of from 15 to 23% by weight is present in the solution phase of the evaporation mixture.

6. A process according to Claim 1, wherein the said carbonation takes place at a steady state sodium chloride concentration in the liquid phase of from 1 to 5% by weight.

7. A process according to Claim 1, wherein said evaporation in step (d) is effected under reduced pressure.

8. A process according to Claim 1, wherein 50 to 85% by weight of total water evaporated is evaporated in the carbonation stage, and correspondingly 50 to 15% by weight of said water is evaporated in the evaporation stage.

9. A process according to Claim 1, wherein said evaporation stage is heated with vapors leaving said carbonation stage.

10. A process according to Claim 1, wherein a NaCl content of from 15 to 23% by weight is present in the solution phase of the evaporation mixture.

11. A process according to Claim 2, wherein a NaCl content of from 15 to 23% by weight is present in the solution phase of the evaporation mixture.

12. A process as defined by Claim 1, wherein the ratio of the percent by volume of said second portion to the percent by weight of salt concentration in the clarified liquor is 5:1 to 50:1.

13. A process as defined by Claim 1, wherein the ratio of the percent by volume of said second portion to the percent by weight of salt concentration in the clarified liquor is 10:1 to 30:1.

References Cited

UNITED STATES PATENTS

| | | | |
|---|---|---|---|
| 1,770,995 | 7/1930 | Pike et al. | 423—429 X |
| 3,079,227 | 2/1963 | Brummer et al. | 423—429 X |
| 2,424,975 | 8/1947 | Ervin | 423—189 |
| 2,135,605 | 11/1938 | Stevenson | 423—195 |
| 3,202,477 | 8/1965 | Loeffler et al. | 423—421 |
| 3,644,089 | 2/1972 | Minz et al. | 423—421 |

FOREIGN PATENTS

| | | | |
|---|---|---|---|
| 1,171,732 | 11/1969 | Great Britain | 423—426 |

JACK COOPER, Primary Examiner

U.S. Cl. X.R.

423—190, 421, 426